(12) United States Patent
Bae et al.

(10) Patent No.: US 12,136,728 B2
(45) Date of Patent: Nov. 5, 2024

(54) LITHIUM METAL ANODE, METHOD FOR MANUFACTURING SAME, AND LITHIUM SECONDARY BATTERY USING SAME

(71) Applicants: POSCO, Pohang-si (KR); RESEARCH INSTITUTE OF INDUSTRIAL SCIENCE & TECHNOLOGY, Pohang-si (KR)

(72) Inventors: Hongyoul Bae, Pohang-si (KR); Jin Hong Kim, Pohang-si (KR); Sihwa Lee, Pohang-si (KR); Weon Soo Bae, Pohang-si (KR); Sang Lag Lee, Pohang-si (KR)

(73) Assignees: POSCO HOLDINGS INC., Seoul (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 722 days.

(21) Appl. No.: 17/292,549

(22) PCT Filed: Jul. 9, 2019

(86) PCT No.: PCT/KR2019/008436
§ 371 (c)(1),
(2) Date: May 10, 2021

(87) PCT Pub. No.: WO2020/096164
PCT Pub. Date: May 14, 2020

(65) Prior Publication Data
US 2022/0149347 A1    May 12, 2022

(30) Foreign Application Priority Data
Nov. 8, 2018  (KR) .................. 10-2018-0136753

(51) Int. Cl.
| | | |
|---|---|---|
| H01M 4/134 | (2010.01) | |
| H01M 4/02 | (2006.01) | |

(Continued)

(52) U.S. Cl.
CPC .......... H01M 4/134 (2013.01); H01M 4/045 (2013.01); H01M 4/0452 (2013.01);
(Continued)

(58) Field of Classification Search
None
See application file for complete search history.

(56) References Cited

U.S. PATENT DOCUMENTS

| | | | | |
|---|---|---|---|---|
| 4,945,014 A | * | 7/1990 | Miyabayashi | ...... H01M 10/052 |
| | | | | 429/231.95 |
| 2002/0086213 A1 | * | 7/2002 | Utsugi | ................. H01M 4/13 |
| | | | | 429/231.95 |

(Continued)

FOREIGN PATENT DOCUMENTS

| | | | |
|---|---|---|---|
| CN | 105470465 A | * | 4/2016 |
| CN | 107293797 A | | 10/2017 |

(Continued)

OTHER PUBLICATIONS

Machine Translation of CN-105470465-A. (Year: 2016).*

(Continued)

*Primary Examiner* — Gregg Cantelmo
(74) *Attorney, Agent, or Firm* — Morgan, Lewis & Bockius LLP (57) ABSTRACT

The present invention relates to a lithium metal anode, a method for manufacturing same, and a lithium secondary battery using same. The lithium metal anode include a current collector having a flat structure and an anode active material layer including a lithium metal disposed on the current collector, wherein the lithium metal has a concave- (Continued)

convex structure and no dendrite is present on the surface of the lithium metal.

12 Claims, 11 Drawing Sheets

(51) Int. Cl.
*H01M 4/04* (2006.01)
*H01M 4/1395* (2010.01)
*H01M 4/36* (2006.01)
*H01M 4/38* (2006.01)
*H01M 10/052* (2010.01)

(52) U.S. Cl.
CPC ......... *H01M 4/1395* (2013.01); *H01M 4/366* (2013.01); *H01M 4/382* (2013.01); *H01M 10/052* (2013.01); *H01M 2004/021* (2013.01); *H01M 2004/027* (2013.01)

(56) References Cited

U.S. PATENT DOCUMENTS

| | | |
|---|---|---|
| 2009/0191463 A1 | 7/2009 | Ide et al. |
| 2017/0040605 A1 | 2/2017 | Hwang et al. |

FOREIGN PATENT DOCUMENTS

| | | |
|---|---|---|
| EP | 2978052 A1 | 1/2016 |
| JP | 2007-157388 A | 6/2007 |
| JP | 2008-034348 A | 2/2008 |
| KR | 10-0582557 B1 | 5/2006 |
| KR | 10-2011-0118717 A | 10/2011 |
| KR | 10-2011-0122177 A | 11/2011 |
| KR | 10-2012-0053180 A | 5/2012 |
| KR | 10-1273100 B1 | 6/2013 |
| KR | 10-2016-0052323 A | 5/2016 |
| KR | 10-1785638 B1 | 10/2017 |
| KR | 10-2018-0021639 A | 3/2018 |
| KR | 10-1833974 B1 | 3/2018 |
| KR | 10-2018-0037898 A | 4/2018 |
| KR | 10-2018-0064197 A | 6/2018 |
| KR | 10-1868574 B1 | 6/2018 |
| KR | 10-2018-0074248 A | 7/2018 |
| KR | 10-2018-0116137 A | 10/2018 |
| KR | 10-2019-0025124 A | 3/2019 |
| KR | 10-2019-0048524 A | 5/2019 |
| KR | 10-2019-0076769 A | 7/2019 |
| KR | 10-2020-0053300 A | 5/2020 |
| KR | 10-2176349 B1 | 11/2020 |
| WO | 2018/117547 A1 | 6/2018 |

OTHER PUBLICATIONS

Machine Translation of KR-20180021639A. (Year: 2018).*
Written Opinion and International Search Report dated Oct. 22, 2019 issued in International Patent Application No. PCT/KR2019/008436 (with partial English translation).
Myung-Hyun Ryou et al., "Mechanical Surface Modification of Lithium Metal: Towards Improved Li Metal Anode Performance by Directed Li Plating," Adv. Funct. Mater. 2015, 25, 834-841 (Dec. 2, 2014).
Extended European Search Report dated Nov. 29, 2021 issued in European Patent Application No. 19882195.1.
Chinese Office Action dated Dec. 4, 2023 issued in Chinese Patent Application No. 201980073729.2.

* cited by examiner

FIG. 4 a) Low magnification surface    b) High magnification surface

FIG. 5 a) Low magnification surface    b) High magnification surface

FIG. 6 a) Surface microstructure of Example 2     b) Image analysis for pore fraction measurement

FIG. 11

LITHIUM METAL ANODE, METHOD FOR MANUFACTURING SAME, AND LITHIUM SECONDARY BATTERY USING SAME

CROSS-REFERENCE OF RELATED APPLICATIONS

This application is the U.S. National Phase under 35 U.S.C. § 371 of International Patent Application No. PCT/KR2019/008436, filed on Jul. 9, 2019, which in turn claims the benefit of Korean Application No. 10-2018-0136753, filed on Nov. 8, 2018, the entire disclosures of which applications are incorporated by reference herein.

TECHNICAL FIELD

A lithium metal anode, a method for manufacturing the same, and a lithium secondary battery using the same are disclosed.

BACKGROUND ART

In order to achieve a lower price but a higher energy density of a secondary battery, a lithium metal electrode has been proposed as an anode thereof.

When lithium metal is used as an anode material, there are problems of causing an electrical short circuit due to dendrite formed during the charge and discharge and shortening a battery cycle-life due to cracks generated by mechanical stress caused by repeated contractions and expansion of the anode material.

In order to overcome these problems, an attempt to develop a lithium anode material having a three-dimensional structure to secure a free space for lithium growth but suppress growth of the dendrite during the charge and discharge has been made.

KR10-2010-0114321 discloses a method of suppressing the dendrite growth by using a patterned silicon substrate to form the three-dimensional anode structure and thus allow the lithium growth alone in the recessed space. However, this method requires advanced process technology over development, etching, etching, and the like based on semiconductor technology and high cost and thus is extremely inefficient and uneconomical.

KR10-2016-0085954 discloses a method of forming a three-dimensional concavo-convex structure by applying a physical force to the surface of lithium metal to transform the lithium metal. However, since the three-dimensional concavo-convex structure formed by applying the physical pressure has too a wide interval of the concavo-convex portion within a range of tens to hundreds of micrometers and also, too a deep depth of the convex portion within a range of tens to hundreds of micrometers, securing the accommodation space through implementing the three-dimensional structure may be very localized. Since this three-dimensional concavo-convex structure also has an insignificant effect on increasing a surface area, there is no effect on suppressing the dendrite growth mainly caused at high currents.

In particular, in order to obtain the desired effects, since the convex portion should be formed deep, lithium metal having a thickness of hundreds of micrometers or more may have the aforementioned concavo-convex portion, but since lithium used for a high energy density lithium battery should have a thin thickness of 10 μm to 50 μm, the aforementioned concavo-convex portion may not be easy to form in this thin film lithium.

DISCLOSURE

In order to overcome the conventional problem, through a simple and efficient method, it is necessary to be able to generate very finely sized concavo-convex over the entire electrode area of the thin film lithium.

To this end, when lithium is formed in the process of electroplating for the current collector through an electrochemical method, it is intended to form a three-dimensional structure having pores naturally without a separate additional process.

Since the thickness, porosity, and particle size of lithium formed through electroplating can be arbitrarily adjusted through the magnitude and time control of the electroplating current, lithium metal from a thin film of several micrometers to a thick film of several tens of micrometers may be easily obtained.

An embodiment of the present invention provides a lithium metal anode including a current collector having a flat structure and an anode active material layer including a lithium metal disposed on the current collector, wherein the lithium metal has a concave-convex structure and no dendrite is present on the surface of the lithium metal.

However, the dendrite refers to a particle in which a ratio of the longest length of the particle in one direction and a length in the direction perpendicular to the longest length of the particle is greater than or equal to 3.

It is possible to control so that a dendrite is not formed through condition control of the electroplating process described later.

Based on the planar projection area of the lithium metal, it may have pores of 5% to 30% with respect to the entire area. The pores refer to a concave portion formed in the depth of the concavo-convex portion when the lithium metal is viewed in a plan view.

This concavo-convex may be formed through electroplating condition control, not through a physical method, and the porosity may be controlled. The depth of the concavo-convex in the thickness direction may be 20 to 100% based on the total thickness of the lithium metal. In addition, the depth of the at least one concavo-convex may be 20 to 50% based on the total thickness of the lithium metal.

That is, the concave portion in the concavo-convex portion in which lithium metal is not electroplated at all to the base surface of the current collector may be present, and the concave portion in the form of electroplating of some lithium metal from the base surface may be also present.

In the lithium metal, an interval of the concavo-convex may be 5 to 100 μm. The interval is also a factor that may be controlled by the process conditions during electroplating. A description of this will be described later in specific embodiments.

The thickness of the lithium metal may be 1 to 100 μm. If the lithium metal is too thick, it is difficult to obtain a sufficient charging effect compared with an increase in the thickness of the battery, and a problem of peeling may occur. If it is too thin, battery characteristics may be deteriorated.

A film may be further included on the surface of the anode active material layer.

The film is formed by a reaction between the electroplated lithium metal and an electrolyte solution during the manufacturing process of the anode, and the thickness, composition, and properties of the film may be controlled by adjusting the composition of the used electrolyte solution and the conditions of the electroplating process.

The thickness of the film may be, for example, 2 nm to 2 μm, and more specifically 10 nm to 500 nm.

If the thickness of the film disposed on the surface of the anode is too thick, lithium ion conductivity may be lowered and interfacial resistance is increased, so that charging/discharging characteristics may be degraded when applying a battery. In addition, if the thickness of the film is too thin, the film may be easily lost in the process of applying the anode according to the embodiment to a battery.

Therefore, it is desirable that the film is formed uniformly and densely over the entire surface of the anode with a thin thickness within a range that satisfies the thickness range.

The film may be a Li—N—C—H—O-based ionic compound, a Li—P—C—H—O-based ionic compound, LiF, or a combination thereof. As described above, the composition of the film may be controlled by the additive of the electrolyte solution and the composition of the electrolyte solution.

For a specific example, the film includes a Li—N—C—H—O-based ionic compound.

In the present embodiment, in the process of pre-lithiation of the anode by an electroplating process, a film including the Li—N—C—H—O-based ionic compound may be formed by adjusting the composition and content of the plating solution.

The Li—N—C—H—O-based ionic compound may include Li—O, C—N, C—O, and C—H bonds.

More specifically, the Li—N—C—H—O-based ionic compound may include a compound represented by one of Chemical Formulas 1 and 2.

[Chemical Formula 1]

In Chemical Formula 1, $R_1$ and $R_2$ are each $CH_mF_{2-m}$ (m=0, one of 1 and 2), $A_1$ is and n1 is an integer from 1 to 10.

[Chemical Formula 2]

In Chemical Formula 2, $R_3$ and $R_4$ are each $CH_mF_{2-m}$ (m=0, one of 1 and 2), $A_2$ is and n2 is an integer from 1 to 10.

More specifically, for example, when the anode is pre-lithiated through a pre-lithiation process using a plating solution in which lithium nitrate ($LiNO_3$) as a nitrogen-based compound is added in an appropriate amount to an ether-based solvent, a film including the compound represented by Chemical Formula 1 or 2 may be formed on the surface of the anode.

Meanwhile, the film may further include LiF in addition to the Li—N—C—H—O-based ionic compound.

The current collector is for electrical connection within the battery.

The current collector may have a form of a thin film, but is not limited thereto. For example, it may have a form of a mesh, a foam, a rod, a wire, and a thin sheet of weaving the wire (fiber).

As the material of the current collector, a material having electrical conductivity and a limited reaction with lithium may be used. Materials of the current collector may include, for example, copper, nickel, titanium, stainless steel, gold, platinum, silver, tantalum, ruthenium, and an alloy thereof, carbon, a conductive polymer, and a composite fiber including a conductive layer coated on a non-conductive polymer, or a combination thereof.

When the thickness of the current collector is thick, the weight of the battery increases and the energy density of the battery decreases. When the thickness of the current collector is thin, it may be damaged by overheating during high current operation, and may be damaged by tension during the battery manufacturing process. Accordingly, the thickness of the current collector may be in the range of 1 μm to 50 μm.

In another embodiment of the present invention, a method of manufacturing lithium metal anode includes preparing a current collector and a lithium source opposed thereto, which are impregnated in an electrolyte solution; and applying a current to the current collector and the lithium source to electroplate lithium metal on the surface of the current collector; wherein, in the applying of the current to the current collector and the lithium source to electroplate lithium metal on the surface of the current collector, the current application is performed through two steps and a current density at second current application is higher than a current density at first current application.

Figure 1:
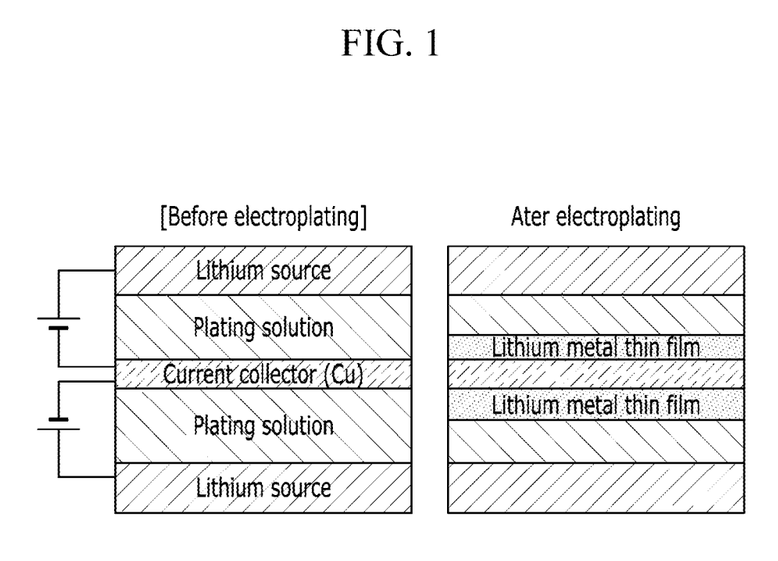
FIG. 1 is a schematic view of an apparatus for a lithium metal anode according to an embodiment of the present invention.

FIG. 1 is a schematic view of an apparatus for a lithium metal anode according to an embodiment of the present invention. As shown in FIG. 1, after both the current collector and the lithium source are impregnated in the electrolyte solution, a current is applied to electroplate the lithium metal on the current collector.

At this time, it is possible to control the current applied twice. From this, a lithium metal having a concavo-convex structure may be manufactured. The specific experimental basis for this will be described later.

More specifically, the current density at the first current application may be 0.2 to 0.8 mA/cm².

The current density at the second current application may be 1 to 4 mA/cm².

The second current application time may be longer than the first current application time.

The first current application time may be 1 to 4 hours, and the second current application time may be 1 to 24 hours.

Such current densities and current application times may be controlled according to the concavo-convex structure of the desired lithium metal.

As the lithium source used during electroplating, an electrolyte solution in which lithium salt is dissolved as well as lithium metal.

The electrolyte solution may be prepared by dissolving a lithium salt in a non-aqueous solvent.

More specifically, the lithium salt may be LiCl, LiBr, LiI, $LiCO_3$, $LiNO_3$, LiFSI, LiTFSI, $LiBF_4$, $LiPF_6$, $LiAsF_6$, $LiClO_4$, $LiN(SO_2CF_3)_2$, LiBOB, or a combination thereof. A concentration of the lithium salt may be 0.1 to 3.0 M based on the total electrolyte solution.

More specifically, in the present embodiment, the electrolyte solution is characterized in that at least one of the lithium salt and the non-aqueous solvent includes a nitrogen-based compound.

The nitrogen-based compound may include, for example, at least one selected from lithium nitrate, lithium bisfluorosulfonyl imide, lithium bis trifluoromethane sulfonimide, caprolactam (e-caprolactam), methyl caprolactam (N-methyl-e-caprolactam), triethylamine, and tributylamine.

Among the nitrogen-based compounds, at least one of lithium nitrate, lithium bisfluorosulfonyl imide, and lithium bistrifluoromethane sulfonimide may be used as a lithium salt.

Among the nitrogen-based compounds, at least one of caprolactam, methyl caprolactam, triethylamine, and tributylamine may be used as a non-aqueous solvent.

Meanwhile, the electrolyte solution may include a general non-aqueous solvent as a solvent in consideration of the viscosity of the plating solution. If the viscosity of the electrolyte solution is too high, mobility of lithium ions decreases and ionic conductivity of the electrolyte solution decreases. Therefore, the time required for the pre-lithiation process may increase, thereby reducing productivity.

The solvent may include, for example, at least one selected from ethylene carbonate, propylene carbonate, dimethyl carbonate, ethyl methyl carbonate, diethyl carbonate, 1,2-dimethoxyethane, diethylene glycol dimethyl ether, tetraethylene glycol dimethyl ether, tetrahydrofuran, 1,3-dioxolane, 1,4-dioxane, and 1,3,5-trioxane.

In another embodiment of the present invention, a lithium secondary battery includes the anode; a cathode; and an electrolyte between the cathode and the anode, wherein the anode is the anode according to an embodiment of the present invention.

In the descriptions of the cathode, the anode, and the electrolyte of the lithium secondary battery, detailed descriptions will be omitted since all the configurations of the currently used battery may be used.

When lithium is formed by electroplating for a current collector through an electrochemical method, a lithium metal anode having a three-dimensional structure naturally having pores can be provided without a separate additional process.

MODE FOR INVENTION

Hereinafter, embodiments of the present invention are described in detail. However, these embodiments are exemplary, the present invention is not limited thereto and the present invention is defined by the scope of claims.

In forming a thin film lithium metal anode to realize a high energy density, it is formed to structurally have a three-dimensional concavo-convex structure, so that lithium may be charged in an empty space during the charge to minimize a volume change of the thin film lithium metal anode during the charge and discharge process.

Accordingly, since stress generation due to the volume change during the charge and discharge process is also suppressed, the lithium anode material may be eventually prevented from cracks due to the charge and discharge.

In addition, the three-dimensional concavo-convex structure is formed with a fine size within a few micrometers to maximize a surface area of the lithium anode and thus lower a current density actually applied during the charge and discharge, resultantly suppressing formation of the lithium dendrite at high currents.

Furthermore, a conventional three-dimensional structure was obtained by separately forming a concavo-convex in a Cu foil or Cu in the form of mesh or foam as a current collector, but the present invention uses the flat Cu foil as it is without a separate process of the current collector and thus may not only be economically competitive but also prevent the dendrite formation due to an empty space and thus achieve excellent charge and discharge performance of a battery.

During the electroplating, a three-dimensional lithium metal may be formed on one surface of the anode current collector, if necessary, and a three-dimensional lithium metal may be also formed on both surfaces of the anode current collector at the same time.

In order to control the thickness of the electroplated lithium, the size of the particles, and the porosity, the magnitude of the electroplating current, the application time, and the current application method may be adjusted to obtain a desired three-dimensional structure.

In addition, an electroplating electrolyte composition and additives may be adjusted to suppress the dendrite formation caused by applying high currents, when the lithium is formed in an electrochemical method. This microstructural control with respect to the lithium metal may make it possible to form the lithium metal with a pore structure but no dendrite, which is not obtained in the conventional method, on the flat current collector.

When this obtained lithium metal and current collector is used as an anode to implement a battery, the three-dimensional pore structure may secure a free space for accommodating the lithium growth during the charge and discharge and thus solve the short circuit problem with a cathode due to the dendrite growth. In addition, since the change in the volume of the anode material may be accommodated, even though the anode material, lithium metal, repeatedly contracts and expands during the charge and discharge, the resulting mechanical stress may be resolved and thus generation of cracks in the anode material may be prevented, thereby improving battery cycle-life.

Hereinafter, examples of the present invention and comparative examples are described. However, the following examples are only examples of the present invention, and the present invention is not limited to the following examples.

EXAMPLES AND COMPARATIVE EXAMPLES (Example 1) Manufacture of Porous Lithium Metal Using Electroplating Process (Adjustment of Electroplating Profile)

A thin film of lithium metal was prepared using an electroplating process in the same manner as in FIG. 1.

A plating solution was prepared by adding 40% of LiFSI and 10% of lithium nitrate based on 100% weight of the plating solution and then, 19% of FEC, a fluorine-based compound, based on the 100% weight of the plating solution thereto. A 500 μm-thick lithium metal plate with purity of 99.9% as a lithium source was pressed onto a copper current collecting plate (a Cu plate), wherein the copper current collector was a 10 μm-thick Cu thin plate (a Cu foil) with both flat surfaces.

In a state that the lithium source and the current collector were electrically insulated in the plating solution, a lithium supply device was used to apply a current to the lithium source and the current collector as each (+) and (−) electrode and thus form a lithium metal layer on the surface of the current collector.

The method of applying the current was divided into two steps, wherein in the first step, the current was applied at a current density of 0.8 mA/cm$^2$ for 1 hour, and in the second step, the current was applied at a current density of 4 mA/cm$^2$ for 1 hour. An about 20 μm-thick lithium thin film was formed by the method as described above.

(Example 2) Porosity Control Through Adjustment of Electroplating Profile

A thin film of lithium metal was prepared in the same manner as in Example 1.

At this time, it was attempted to change the pore structure of the lithium metal and the resulting concavo-convex structure by adjusting the magnitude and time of the applied current.

The method of applying the current was divided into two steps, wherein in the first step, the current was applied with a current density of 0.4 mA/cm$^2$ for 2 hours, and in the second step, the current was applied at a current density of 2 mA/cm$^2$ for 1 hour. An about 20 μm-thick lithium thin film was formed by the method as described above.

(Example 3) Porosity Control Through Adjustment of Electroplating Profile

A thin film of lithium metal was prepared in the same manner as in Example 1.

At this time, it was attempted to change the pore structure of the lithium metal and the resulting concavo-convex structure by adjusting the magnitude and time of the applied current.

The method of applying the current was divided into two steps, wherein in the first step, the current was applied with a current density of 0.2 mA/cm$^2$ for 4 hours, and in the second step, the current was applied at a current density of 1 mA/cm$^2$ for 4 hours. An about 20 μm-thick lithium thin film was formed by the method as described above.

(Example 4) Thickness Control Through Adjustment of Electroplating Profile

A thin film of lithium metal was prepared in the same manner as in Example 1.

At this time, it was attempted to change pores, concavo-convex structure, and thickness of the manufactured lithium metal by adjusting the magnitude and time of the applied current.

The method of applying the current was divided into two steps, wherein in the first step, the current was applied with a current density of 0.2 mA/cm$^2$ for 1 hour, and in the second step, the current was applied at a current density of 1 mA/cm$^2$ for 24 hours. In the aforementioned method, an about 100 μm-thick lithium thin film was formed.

(Comparative Example 1) Porosity and Thickness Effect Through Adjustment of Electroplating Profile A thin film of lithium metal was prepared in the same manner as in Example 1.

At this time, it was attempted to change pores, concavo-convex structure, and thickness of the manufactured lithium metal by adjusting the magnitude and time of the applied current.

The method of applying the current was performed at a current density of 2 mA/cm$^2$ for 0.6 hours, forming an about 5 μm-thick lithium thin film.

(Comparative Example 2) Porosity Effect Through Adjustment of Electroplating Profile A thin film of lithium metal was prepared in the same manner as in Example 1.

At this time, it was attempted to change the pore structure of the lithium metal and the resulting concavo-convex structure by adjusting the magnitude and time of the applied current.

The method of applying the current was performed at a current density of 0.2 mA/cm$^2$ for 24 hours, forming an about 20 μm-thick lithium thin film.

Table 1 shows electroplating conditions of the examples and the comparative examples and the results thereof.

TABLE 1

| | First current application | | Second current application | | Lithium metal |
| --- | --- | --- | --- | --- | --- |
| | Current (mA/cm$^2$) | Time (h) | Current (mA/cm$^2$) | Time (h) | thickness (μm) |
| Example 1 | 0.8 | 1 | 4 | 1 | 20 |
| Example 2 | 0.4 | 2 | 2 | 2 | 20 |
| Example 3 | 0.2 | 4 | 1 | 4 | 20 |
| Example 4 | 0.2 | 1 | 1 | 24 | 100 |
| Comparative Example 1 | 2.0 | 0.6 | — | — | 5 |
| Comparative Example 2 | 0.2 | 24 | — | — | 20 |

EXPERIMENTAL EXAMPLES

Figure 2:
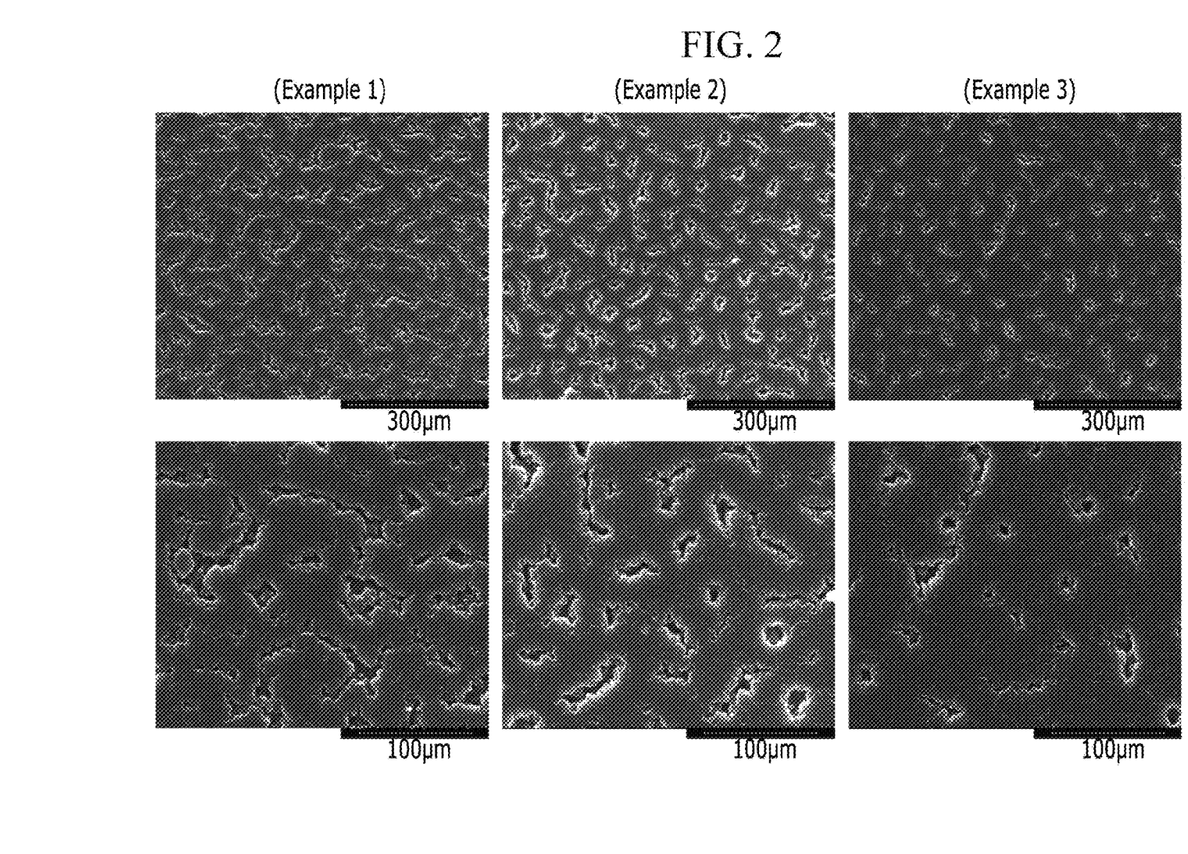
FIG. 2 shows shapes of the microstructures of the surfaces of lithium metals controlled by Examples 1, 2, and 3.

FIG. 2 shows shapes of the microstructures of the surfaces of the lithium metals controlled in Examples 1, 2, and 3. In the lithium metal thin films having the same thickness of about 20 μm, the microstructures with different porosity and the resulting different concavo-convex shapes were formed.

Figure 3:
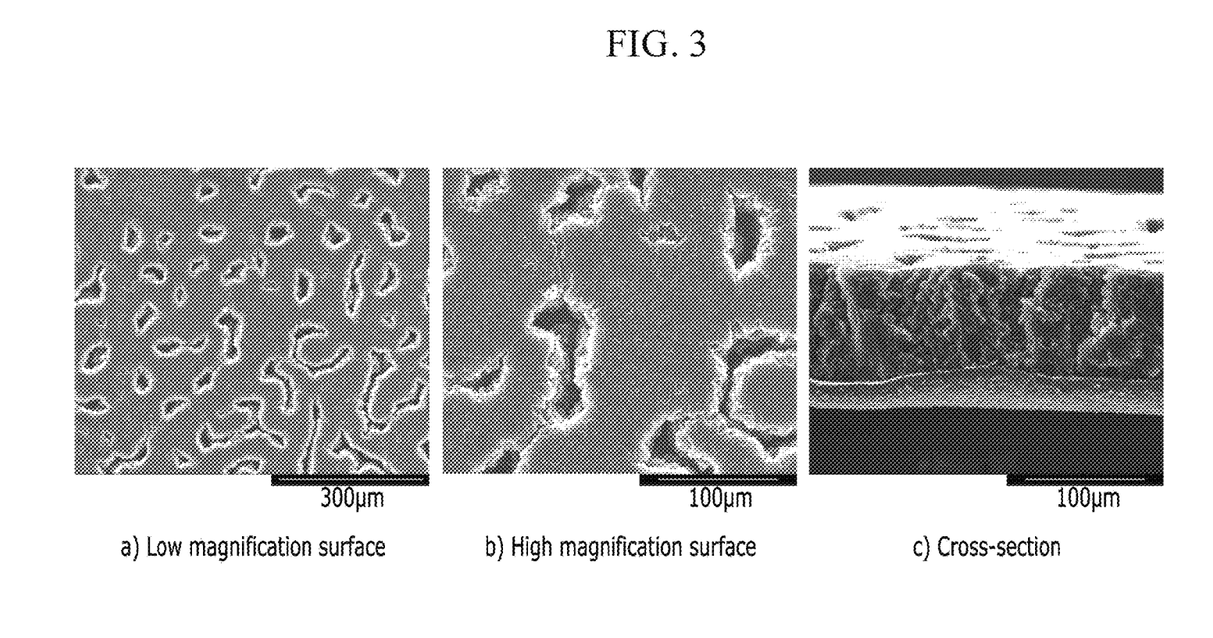
FIG. 3 shows a surface and cross-sectional microstructure of a lithium metal having a thickness of 100 μm formed according to Example 4.

FIG. 3 shows the surface and cross-sectional microstructures of the an 100 μm-thick lithium metal foil formed according to Example 4.

Even though the lithium metal became thicker, a three-dimensional porous structure was formed with no dendrite formation by adjusting the current and time factors of the electroplating process.

Figure 4:
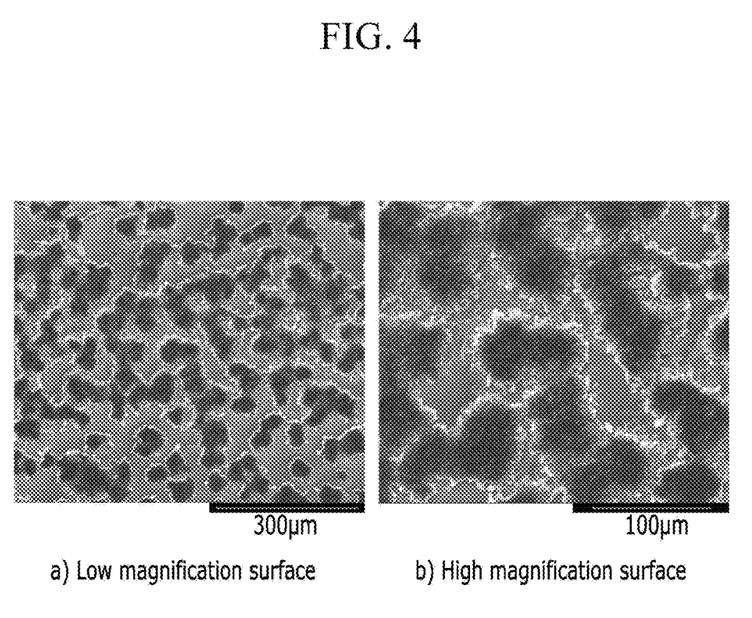
FIG. 4 is a photograph of a surface of a lithium metal formed according to Comparative Example 1.

On the other hand, FIG. 4 shows Comparative Example 1, a case of having an extremely high pore fraction, since lithium metal was insufficiently formed by the electroplating and thus not formed on a large portion out of the entire area. In addition, at the edges of particles, lots of dendrites were formed.

Figure 5:
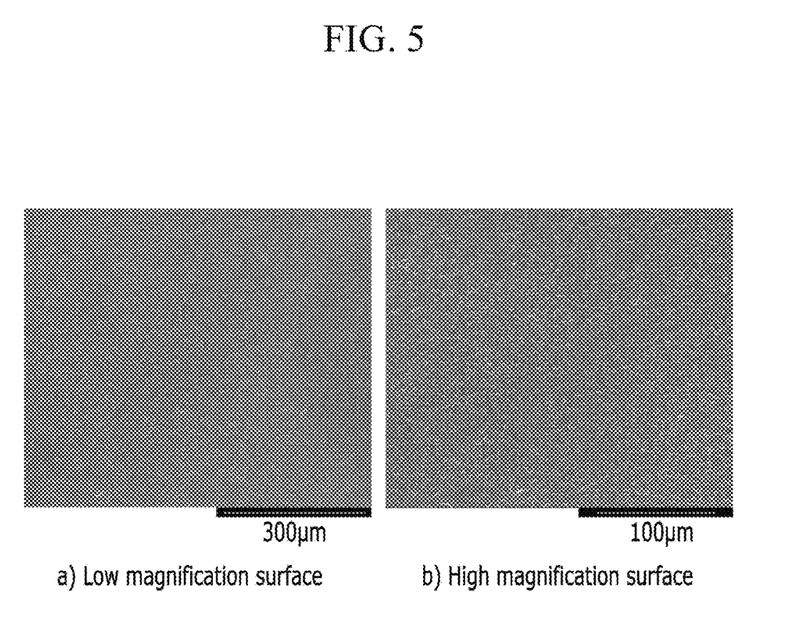
FIG. 5 is a photograph of a surface of a lithium metal formed according to Comparative Example 2.

FIG. 5 shows a structure in which lithium was completely electroplated over the entire area, so that no pores appear due to the microstructure, and thus no concavo-convex on the surface are also formed.

Figure 6:
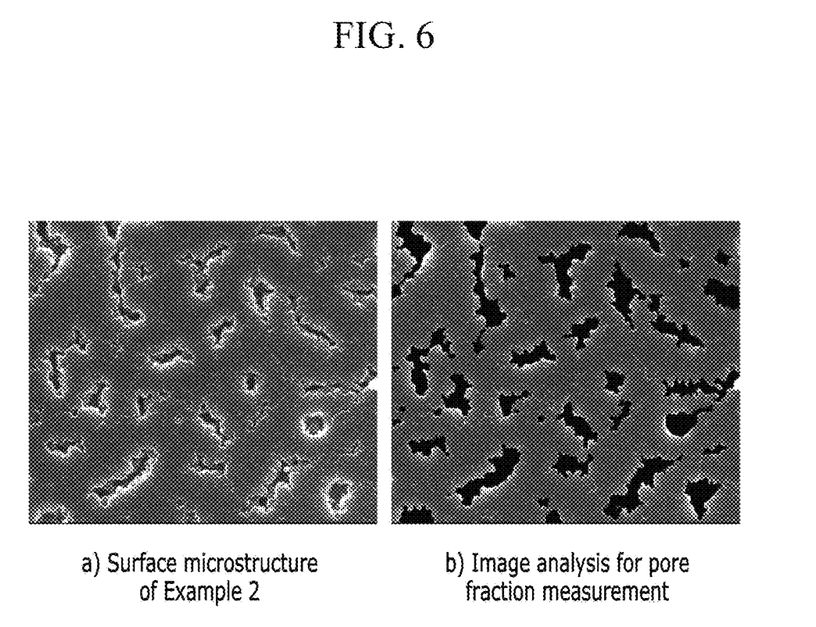
FIG. 6 is an image analysis photograph of the surface of Example 2 in order to analyze a porosity.

FIG. 6 is an image analysis photograph of the surface of Example 2 in order to analyze a porosity.

Specifically, in order to compare pores formed by the electroplating and the resulting concavo-convex states, each surface microstructure photograph shown in FIG. 6 was image-analyzed to measure a pore fraction in an entire area. The values are shown in Table 2.

TABLE 2

|  | Pore fraction (%) |
| --- | --- |
| Example 1 | 21.3 |
| Example 2 | 17.3 |
| Example 3 | 6.9 |
| Example 4 | 14.4 |
| Comparative Example 1 | 45.8 |
| Comparative Example 2 | 0.3 |

* For the examples and the comparative examples produced through the electroplating process, the pore fraction based on the planar projection area is shown.

Figure 7:
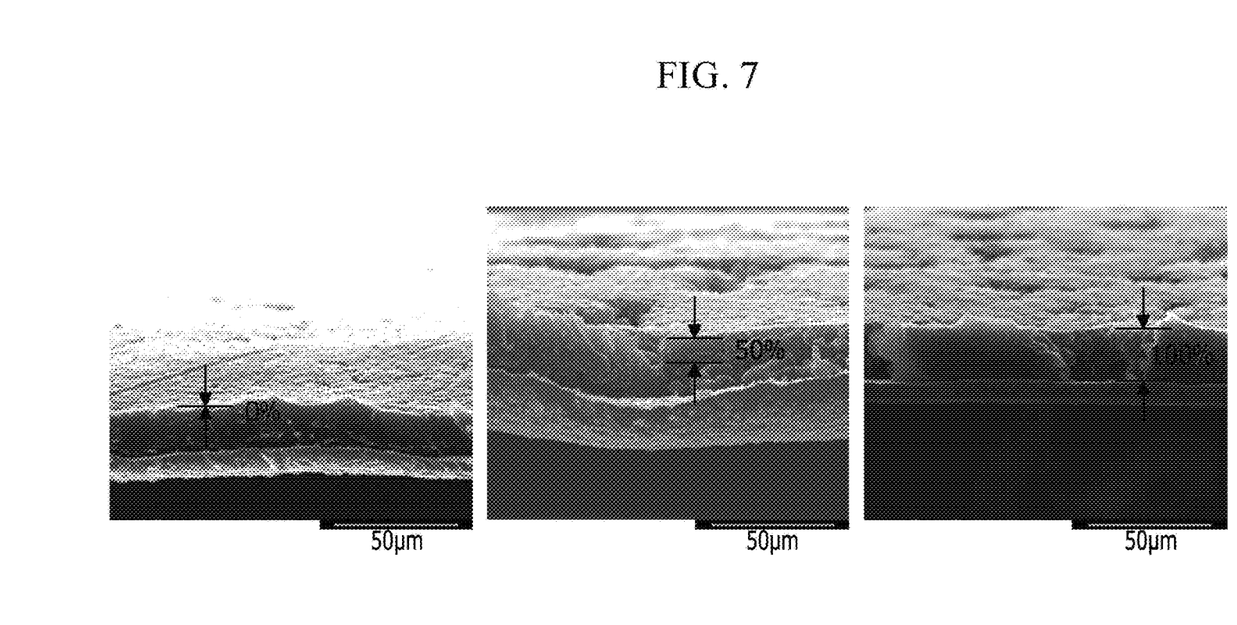
FIG. 7 shows a method of measuring the depths of the concavo-convex generated by the electroplating process, that is, distances in the thickness direction from the surface of electroplated lithium.

FIG. 7 shows a method of measuring the depths of the concavo-convex generated by the electroplating process, that is, distances in the thickness direction from the surface of electroplated lithium. In a photograph showing the cross-section of the electroplated lithium, when a total thickness of the electroplated lithium was assumed as 100%, a flat surface state was marked as 0%, a state that a concave portion of the concavo-convex reached a half of the entire lithium was marked as 50%, and a state that the concave portion reached the copper current collector was marked as 100%.

Table 3 shows minimum values and maximum values among the concavo-convex depths excluding flat surface values with respect to the examples and the comparative examples obtained by the electroplating.

In Examples 1 to 4, minimum depths formed by pores were in a range of 20% to 50% of the total lithium thickness, and maximum depths of the concavo-convex were 100% where the concave portion of the concavo-convex reached the copper current collector.

In Comparative Example 1, a maximum depth of the concavo-convex was 100%, but since a portion where lithium metal was not formed was too large, a minimum depth of the concavo-convex was immeasurable in the other portion excluding the flat surface.

In Comparative Example 2, since a cross-section was very dense, the number of concavo-convex formed by the pores was not only very small, but also a maximum depth of the concavo-convex was about 10% or less.

TABLE 3

|  |  | Depth of concavo-convex | |
| --- | --- | --- | --- |
|  | Lithium metal thickness (μm) | Minimum (%) | Maximum (%) |
| Example 1 | 20 | 50 | 100 |
| Example 2 | 20 | 40 | 100 |
| Example 3 | 20 | 20 | 100 |
| Example 4 | 100 | 30 | 100 |
| Comparative Example 1 | 5 | — | 100 |
| Comparative Example 2 | 20 | 0 | 10 |

Figure 8:
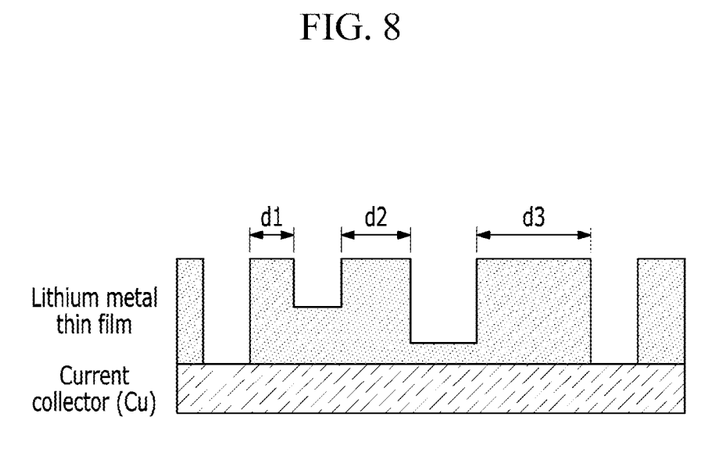
FIGS. 8 and 9 show a method of measuring the intervals of the concavo-convex generated by the electroplating process.
Figure 9:
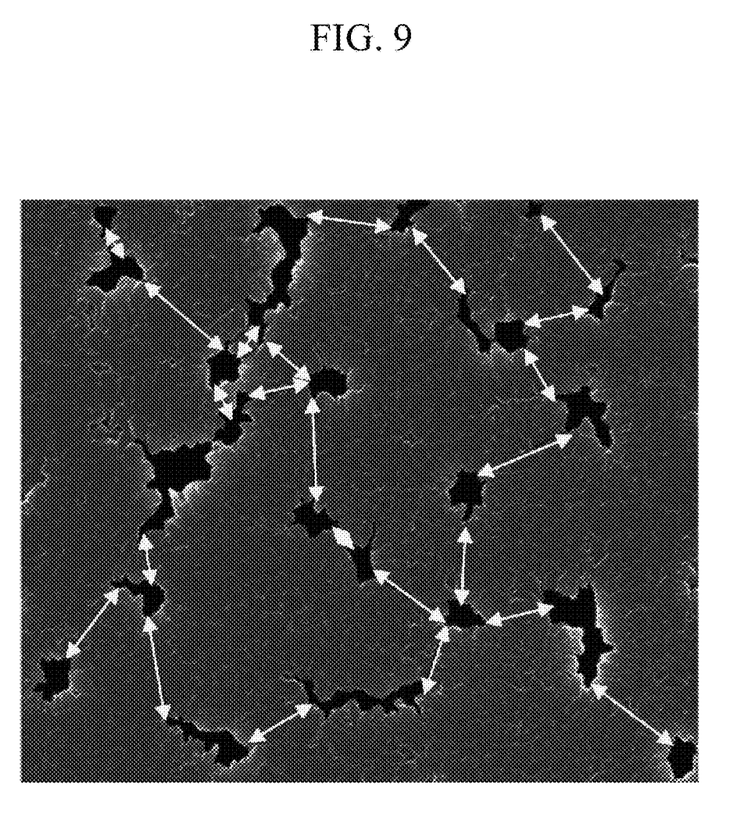

FIGS. 8 and 9 show a method of measuring the intervals of the concavo-convex generated by the electroplating process. The intervals of the concavo-convex indicate lengths defined as d1, d2, d3, etc. in the schematic cross-sectional view of FIG. 8 and were obtained by measuring an inter-particle distance between the pores in the surface microstructure photograph of FIG. 9.

Figure 10:
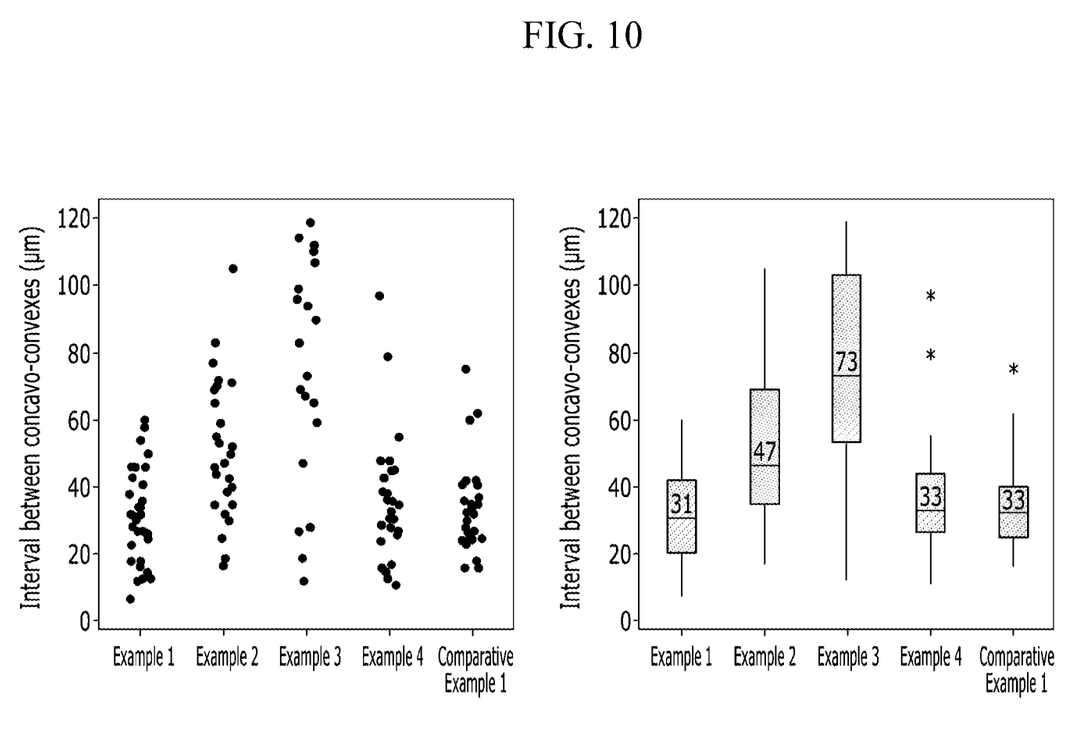
FIG. 10 shows a scatter plot and a box plot showing the measured values for the intervals of the concavo-convex.

Table 4 summarizes minimum, maximum, average, and median values of the intervals of the concavo-convex with respect to the examples and the comparative examples by the electroplating process. In addition, FIG. 10 shows a scatter plot and a box plot showing the measured values for the intervals of the concavo-convex.

In a conventional three-dimensional structure formed by applying a physical force, lithium metal with a thickness of hundreds of micrometers was transformed to have wide intervals of the concavo-convex with a width of about tens to hundreds of micrometers, but in Examples 1 to 4 according to the present invention, a lithium thin film with a thickness of 20 μm to 100 μm had fine intervals of concavo-convex with a width of about 10 μm to 100 μm. This well serves a fundamental goal of forming the three-dimensional structure, that is, securing a micro space and expanding a surface area.

When Examples 1, 2, and 3 having the same thickness are compared, a pore area gradually decreased from Example 1 to Example 3, but the intervals of the concavo-convex gradually increased. On the other hand, in Comparative Example 2, the intervals of the concavo-convex were immeasurable due to too high density.

TABLE 4

|  | Interval of concavo-convex (μm) | | | |
| --- | --- | --- | --- | --- |
|  | Minimum | Maximum | Average | Median |
| Example 1 | 7 | 60 | 32 | 31 |
| Example 2 | 17 | 105 | 50 | 47 |
| Example 3 | 12 | 119 | 74 | 73 |
| Example 4 | 11 | 97 | 36 | 33 |
| Comparative Example 1 | 16 | 75 | 33 | 33 |
| Comparative Example 2 | — | — | — | — |

Figure 11:
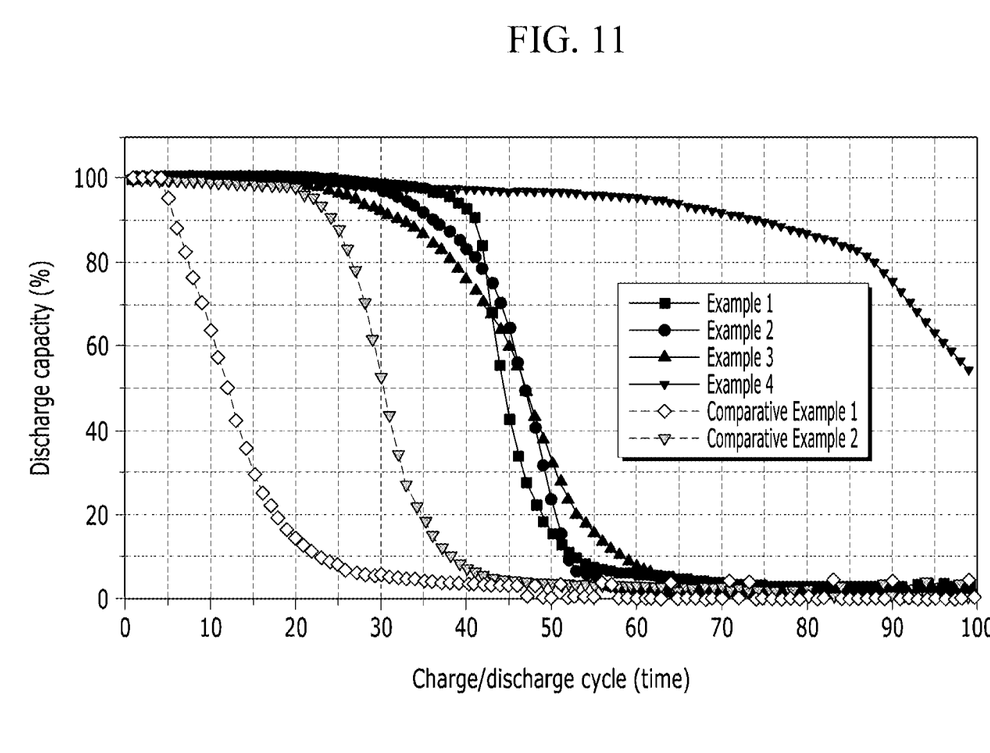
FIG. 11 shows evaluation results of charge/discharge performances of lithium secondary battery cells to which a lithium metal anode manufactured according to Examples 1, 2, 3 and 4 and Comparative Examples 1 and 2 is applied.

FIG. 11 shows evaluation results of charge/discharge performances of lithium secondary battery cells to which a lithium metal anode manufactured according to Examples 1, 2, 3 and 4 and Comparative Examples 1 and 2 is applied.

In addition, Table 5 shows the results of evaluating charge and discharge cycle-life based on 80% of the initial discharge capacity. Referring to FIG. 11 and Table 5, in the case of the embodiment having pores and concavo-convex structures, charging and discharging performance is greatly improved. The reason is that the structure formed by the present invention had an effect of suppressing formation of dendritic phases of lithium during the charge and discharge process and also, generation of lithium electrode cracks due to the charge and discharge stress.

On the other hand, Example 4 exhibited very excellent charge and discharge performance, because the lithium metal thickness of Example 4 was 100 μm, which was thicker than 20 μm of the lithium metal thickness of Examples 1, 2, and 3, bringing about an excessive lithium supply effect in addition to the effect of the present invention.

TABLE 5

|  | Charge and discharge cycle-life (times) |
|---|---|
| Example 1 | 42 |
| Example 2 | 41 |
| Example 3 | 38 |
| Example 4 | 88 |
| Comparative Example 1 | 7 |
| Comparative Example 2 | 26 |

When a lithium metal having a porous three-dimensional concavo-convex structure according to the present invention was used as an anode to configure a lithium secondary battery cell, lithium was charged in an empty space during the charge process and thus minimized a volume change during the charge and discharge process and suppressed stress generation due to the volume change, resultantly preventing generation of cracks of the lithium anode during the charge and discharge.

In addition, the three-dimensional structure expanded a surface area of the lithium anode and reduced actual current density applied thereto during the charge and discharge and thus had the effect of suppressing lithium dendrite during the charge at a high current.

In particular, the present invention may, unlike a conventional method of using a separate preliminary process for forming the three-dimensional structure, used a flat current collector and thus achieve an excellent economical effect due to the process simplification.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, the aforementioned embodiments should be understood to be exemplary but not limiting the present invention in any way.

The invention claimed is:

1. A lithium metal anode, comprising
a current collector having a flat structure, and
an anode active material layer including a lithium metal disposed on the current collector, and
the lithium metal has a concavo-convex structure,
wherein no dendrite is present on the surface of the lithium metal,
provided that the dendrite refers to a particle in which a ratio of the longest length of the particle in one direction and a length in the direction perpendicular to the longest length of the particle is greater than or equal to 3,
wherein based on a planar projection area of the lithium metal, the lithium metal has pores of 5% to 30% with respect to an entire planar projection area,
wherein a depth of the concavo-convex structure in a thickness direction is 20% to 100% based on total thickness of lithium metal,
wherein a minimum depth of the concavo-convex structure in a thickness direction is 20% to 50%, and
wherein a maximum depth of the concavo-convex structure in a thickness direction is 100%.

2. The lithium metal anode of claim 1, wherein
in the lithium metal,
a depth of the concavo-convex structure is 20% to 50% based on the total thickness of the lithium metal.

3. The lithium metal anode of claim 1, wherein
in the lithium metal,
an interval of the concavo-convex is 5 μm to 100 μm.

4. The lithium metal anode of claim 1, wherein thickness of the lithium metal is 1 μm to 100 μm.

5. The lithium metal anode of claim 1, wherein a film is further included on a surface of the anode active material layer.

6. The lithium metal anode of claim 5, wherein the film is a Li—N—C—H—O-based ionic compound, a Li—P—C—H—O-based ionic compound, LiF, or a combination thereof.

7. A lithium secondary battery, comprising
a cathode;
an anode; and
an electrolyte between the cathode and anode, and
the anode is the anode of claim 1.

8. A method of manufacturing lithium metal anode, comprising
preparing a current collector and a lithium source opposed thereto, which are impregnated in an electrolyte solution; and
applying a current to the current collector and the lithium source to electroplate lithium metal on a surface of the current collector,
wherein in applying of the current to the current collector and the lithium source to electroplate lithium metal on the surface of the current collector,
the current application is performed through two steps, and
a current density at second current application is higher than a current density at first current application,
wherein the current density at the first current application is 0.2 mA/cm$^2$ to 0.8 mA/cm$^2$.

9. The method of claim 8, wherein the current density at the second current application is 1 mA/cm$^2$ to 4 mA/cm$^2$.

10. The method of claim 8, wherein the second current application time is longer than the first current application time.

11. The method of claim 10, wherein the first current application time is 1 hour to 4 hours.

12. The method of claim 10, wherein the second current application time is 1 hour to 24 hours.

* * * * *